US012634320B2

(12) United States Patent
Thiyagarajan et al.

(10) Patent No.: US 12,634,320 B2
(45) Date of Patent: May 19, 2026

(54) SYSTEM AND METHOD FOR PROVIDING ADVANCED NEURON-LEVEL VULNERABILITY ANALYSIS IN NEURAL NETWORK-BASED MODELS

(71) Applicant: JPMorgan Chase Bank, N.A., New York, NY (US)

(72) Inventors: Sanjay Thiyagarajan, Tiruppur (IN); Abhishek Biyal, Bengaluru (IN); Sarath Vepakomma, Bangalore (IN); Scott R Stevens, Wilmington, DE (US); Kamal Pande, Dehradun (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 58 days.

(21) Appl. No.: 18/902,050

(22) Filed: Sep. 30, 2024

(65) Prior Publication Data

US 2025/0119445 A1     Apr. 10, 2025

(30) Foreign Application Priority Data

Oct. 7, 2023    (IN) .............................. 202311067347

(51) Int. Cl.
*H04L 9/40* (2022.01)
(52) U.S. Cl.
CPC ........ *H04L 63/1425* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 2017/0187747 A1* | 6/2017 | Huston, III | ........... G06N 3/044 |
| 2019/0156204 A1* | 5/2019 | Bresch | .................. G06N 3/045 |
| 2021/0048808 A1* | 2/2021 | Bielby | .............. G05B 23/0254 |
| 2021/0279950 A1* | 9/2021 | Phalak | .................. G06F 18/231 |

* cited by examiner

*Primary Examiner* — Trang T Doan
(74) *Attorney, Agent, or Firm* — Greenblum & Bernstein, P.L.C.

(57) ABSTRACT

A method and system for performing a neural level vulnerability detection are disclosed. The method includes receiving a neural network model, performing a bit-level corruption check on the received neural network model indicating a potential presence of an embedded malware in the neural network model, and deploying the neural network model. The method further includes scheduling a periodic anomaly detection on the deployed neural network model, performing the periodic anomaly detection on the deployed neural network model for detecting an anomaly at a scheduled time, and when the anomaly is detected on the neural network model, executing an explainable artificial intelligence based embedded malware exploration to identify an alteration made by the embedded malware at a neuron level of the neural network model.

20 Claims, 7 Drawing Sheets

Figure 4:
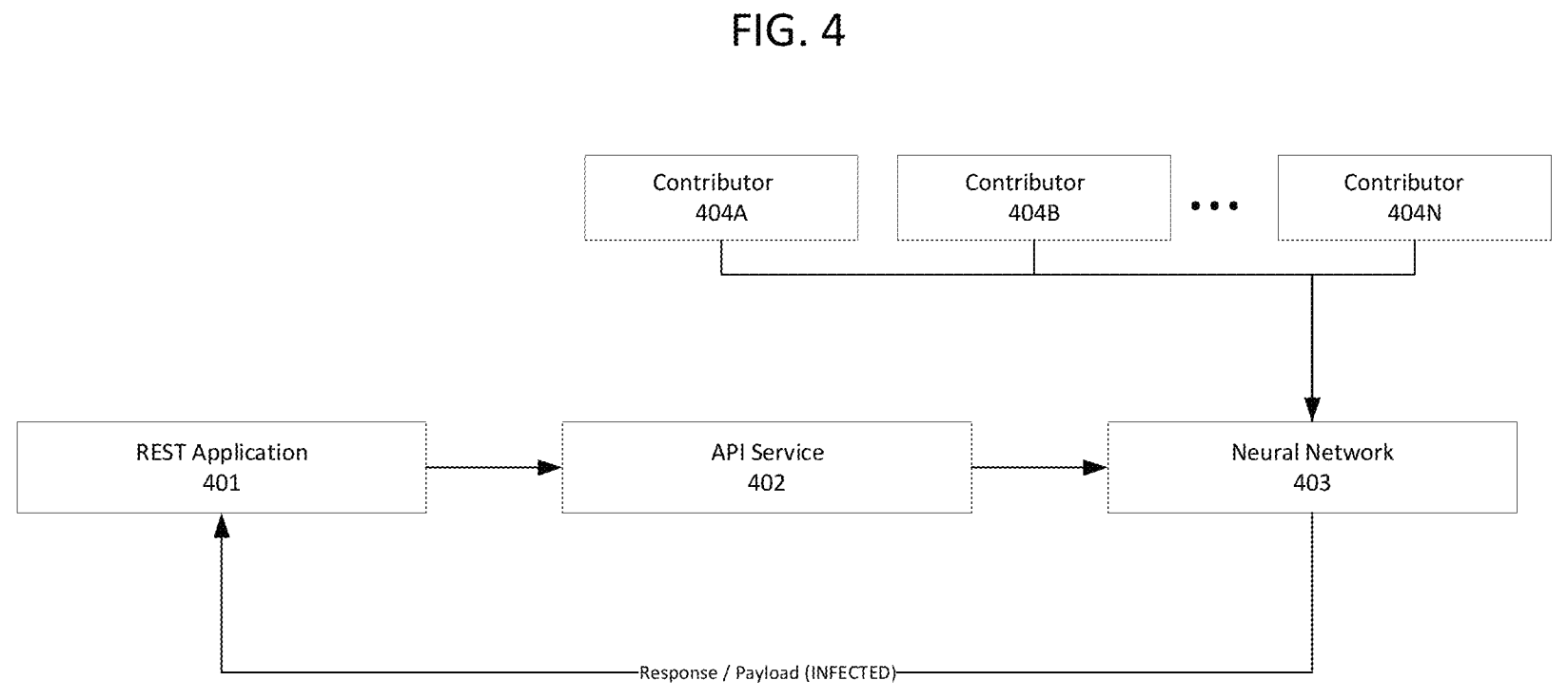

Contributor
404A

Contributor
404B

Contributor
404N

Neural Network
403

API Service
402

REST Application
401

Response / Payload (INFECTED)

SYSTEM AND METHOD FOR PROVIDING ADVANCED NEURON-LEVEL VULNERABILITY ANALYSIS IN NEURAL NETWORK-BASED MODELS

CROSS-REFERENCE TO RELATED APPLICATION

This application claims priority benefit from Indian Application No. 202311067347, filed Oct. 7, 2023, which is hereby incorporated by reference in its entirety.

TECHNICAL FIELD

This disclosure generally relates to data processing. More specifically, the present disclosure generally relates to advanced neuron-level vulnerability analysis in neural network-based models for protecting against neuron-level malware attacks.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, machine learning models are being used for various applications and services, ranging from risk estimation to generative business modelling. Such machine learning models may be deployed in real-time. However, because of the real-time deployment, such models may be more vulnerable to malware attacks and thus, a secure testing pipeline may be important.

One of the concerns in this context is the potential for neuron-level malware embedding in neural network based models. Neuron level attacks are highly sophisticated and specifically target the neural networks utilized by the applications rather than exploiting conventional code vulnerabilities. However, neuron level malware embedding attacks may not be reliably identified by conventional code vulnerability scanning techniques.

SUMMARY

According to an aspect of the present disclosure, a method for performing neural level vulnerability detection is provided. The method includes receiving, by a processor, a new or updated version of a neural network model; performing, by the processor, a bit-level corruption check on the received neural network model indicating a potential presence of an embedded malware in the neural network model; determining, by the processor, whether the neural network model includes the bit-level corruption or not; when the neural network model is determined not to include the bit-level corruption, deploying, by the processor, the neural network model; upon deployment, scheduling a periodic anomaly detection on the deployed neural network model; at a scheduled time, performing the periodic anomaly detection on the deployed neural network model for detecting an anomaly; when the anomaly is detected on the neural network model, executing an explainable artificial intelligence (AI) based embedded malware exploration to identify an alteration made by the embedded malware at a neuron level of the neural network model; and transmitting, to another device by the processor and over a network, an alert along with the alteration made by the embedded malware.

According to another aspect of the present disclosure, the performing of the periodic anomaly detection on the deployed neural network model includes checking of outputs of the neural network model.

According to another aspect of the present disclosure, the performing of the periodic anomaly detection on the deployed neural network model includes checking for activations in the neural network model.

According to yet another aspect of the present disclosure, the performing of the periodic anomaly detection on the deployed neural network model includes checking of performance of the neural network model.

According to another aspect of the present disclosure, the performing of the periodic anomaly detection on the deployed neural network model includes checking for a deviation from expected behavior.

According to a further aspect of the present disclosure, the checking for the deviation is performed using test input for which output is known.

According to yet another aspect of the present disclosure, the executing of the explainable AI based embedded malware exploration includes analyzing the neural network model at a neuron level.

According to a further aspect of the present disclosure, the analyzing the neural network at the neuron level includes identifying connections of a target neuron with one or more other neurons.

According to another aspect of the present disclosure, the analyzing the neural network at the neuron level further includes an output provided or contributed by the target neuron.

According to a further aspect of the present disclosure, the scheduling of the periodic anomaly detection includes scheduling the periodic anomaly detection to be performed intermittently.

According to a further aspect of the present disclosure, the neural network model is deployed into a production environment.

According to a further aspect of the present disclosure, the neural network model is deployed into a testing environment.

According to a further aspect of the present disclosure, the other device to which the alert is transmitted includes a display device.

According to another aspect of the present disclosure, the bit-level corruption check includes: a file integrity check that verify checksum to detect file-level corruption; a weight level integrity check that convert weights into bit-level representation and compare against expected values using cyclic redundancy check (CRC); a redundant model comparison that compares weights with a redundant mirrored model copy to detect discrepancies cause by corruption; and a layer-by-layer bit level parity check that compute and verify parity bits before and after interference to ensure no bits have flipped during computation.

According to a further aspect of the present disclosure, the weight level integrity check, the redundant model parison and the layer-by-layer bit level parity check are performed in sequence.

According to a further aspect of the present disclosure, the periodic anomaly detection includes: logging neuron activations for each layer of the neural network model; profiling a normal behavior while performing training of the neural network model; detecting deviations or outliers in neuron behavior during inference; visualizing and quantifying neurons contributing to an anomaly or decision; and performing layer-wise detection of neurons which are most significant in anomaly detection.

According to another aspect of the present disclosure, the periodic anomaly detection is performed based on the explainable AI.

According to an aspect of the present disclosure, a system for performing a neural level vulnerability detection is provided. The system includes a memory, a display and a processor. The system is configured to perform: receiving a new or updated version of a neural network model; performing a bit-level corruption check on the received neural network model indicating a potential presence of an embedded malware in the neural network model; determining whether the neural network model includes the bit-level corruption or not; when the neural network model is determined not to include the bit-level corruption, deploying the neural network model; upon deployment, scheduling a periodic anomaly detection on the deployed neural network model; at a scheduled time, performing the periodic anomaly detection on the deployed neural network model for detecting an anomaly; when the anomaly is detected on the neural network model, executing an explainable AI based embedded malware exploration to identify an alteration made by the embedded malware at a neuron level of the neural network model; and transmitting, to another device over a network, an alert along with the alteration made by the embedded malware.

According to another aspect of the present disclosure, a non-transitory computer readable storage medium that stores a computer program for performing a neural level vulnerability detection is provided. The computer program, when executed by a processor, causes a system to perform multiple processes including: receiving a new or updated version of a neural network model; performing a bit-level corruption check on the received neural network model indicating a potential presence of an embedded malware in the neural network model; determining whether the neural network model includes the bit-level corruption or not; when the neural network model is determined not to include the bit-level corruption, deploying the neural network model; upon deployment, scheduling a periodic anomaly detection on the deployed neural network model; at a scheduled time, performing the periodic anomaly detection on the deployed neural network model for detecting an anomaly; when the anomaly is detected on the neural network model, executing an explainable AI based embedded malware exploration to identify an alteration made by the embedded malware at a neuron level of the neural network model; and transmitting, to another device over a network, an alert along with the alteration made by the embedded malware.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a system architecture for utilizing an open-sourced neural network model.

DETAILED DESCRIPTION

Figure 1:
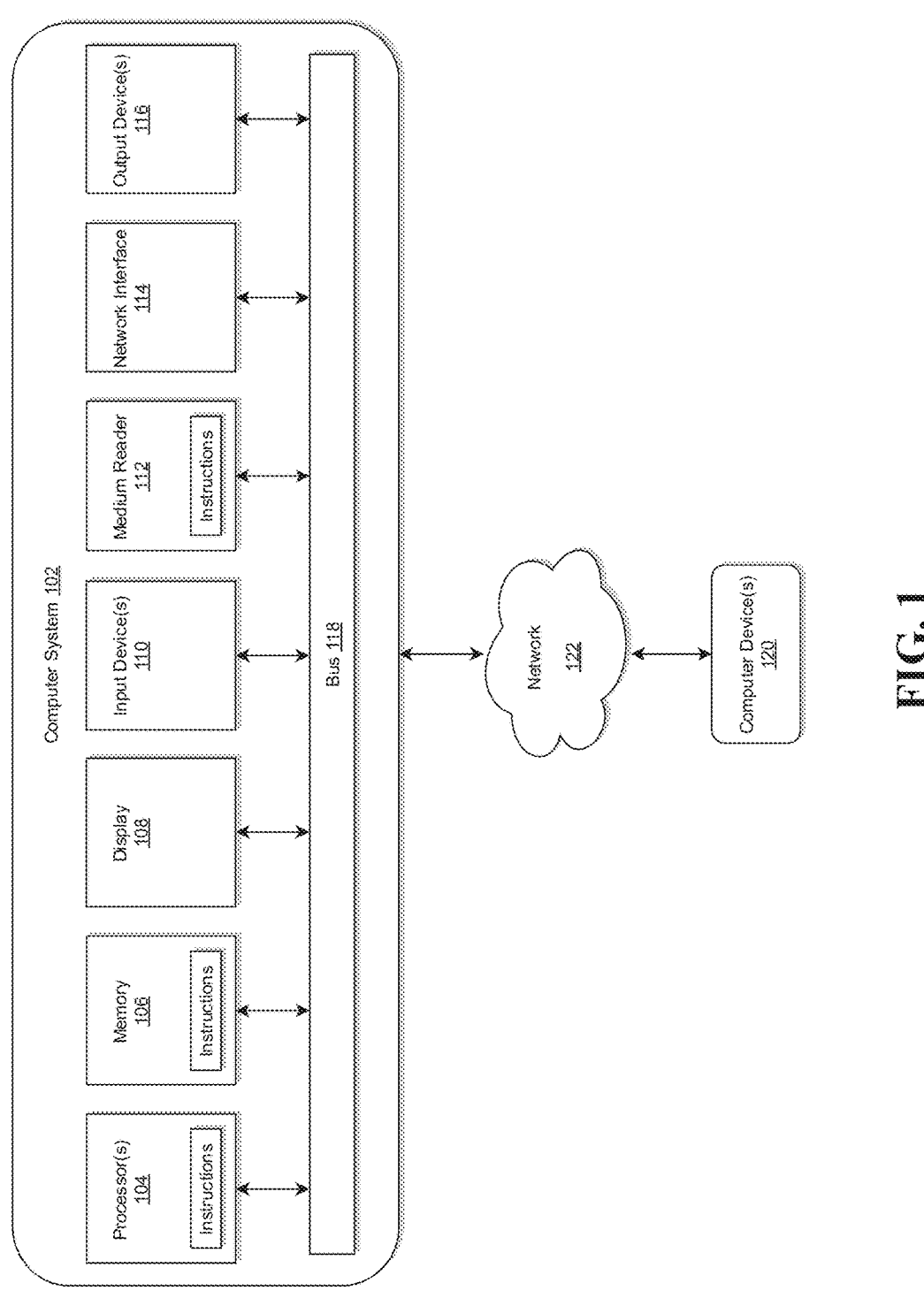
FIG. 1 illustrates a computer system for implementing a neural level vulnerability detection (NLVD) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

According to exemplary aspects, a comprehensive system to protect a neural network model against advanced neuron level malware embedding attacks is presented. By leveraging a specialized anomaly detection algorithm and an explainable AI algorithm, the comprehensive system may effectively detect and mitigate presence of embedded malware within the neural networks, which may go undetected by conventional scanning techniques or tools. The comprehensive system, which may detect malware vulnerability at a neuron level, may be configured to perform continuous monitoring and real-time analysis to ensure that the integrity and reliability of the neural network based models in use are maintained.

FIG. 1 illustrates a computer system for implementing a neural level vulnerability detection (NLVD) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
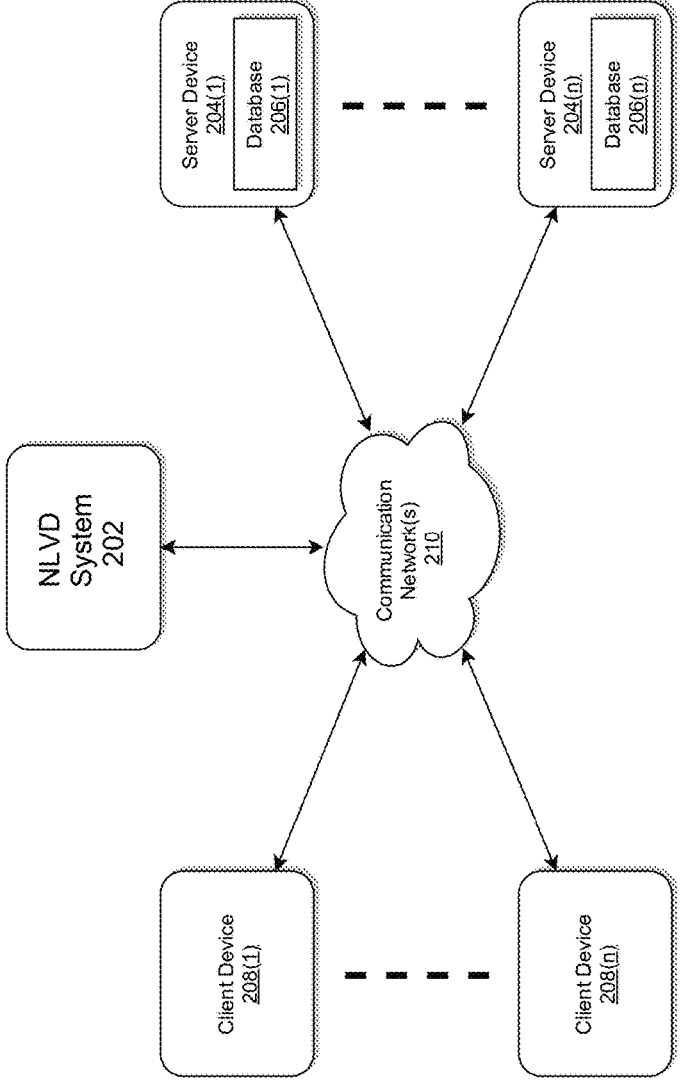
FIG. 2 illustrates an exemplary diagram of a network environment with an NLVD system in accordance with an exemplary embodiment.

FIG. 2 illustrates an exemplary diagram of a network environment with an NLVD system in accordance with an exemplary embodiment.

An NLVD system 202 may be implemented with one or more computer systems similar to the computer system 102 as described with respect to FIG. 1.

The NLVD system 202 may store one or more applications that can include executable instructions that, when executed by the NLVD system 202, cause the NLVD system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the NLVD system 202 itself, may be located in virtual server(s) running in a cloud-based computing environment rather than being tied to one or more specific physical network computing devices. Also, the application(s) may be running in one or more virtual machines (VMs) executing on the NLVD system 202. Additionally, in one or more embodiments of this technology, virtual machine(s) running on the NLVD system 202 may be managed or supervised by a hypervisor.

In the network environment 200 of FIG. 2, the NLVD system 202 is coupled to a plurality of server devices 204(1)-204(n) that hosts a plurality of databases 206(1)-206(n), and also to a plurality of client devices 208(1)-208(n) via communication network(s) 210. A communication interface of the NLVD system 202, such as the network interface 114 of the computer system 102 of FIG. 1, operatively couples and communicates between the NLVD system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the NLVD system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The NLVD system 202 may be a standalone device or integrated with one or more other devices or apparatuses, such as one or more of the server devices 204(1)-204(n), for example. In one particular example, the NLVD system 202 may be hosted by one of the server devices 204(1)-204(n), and other arrangements are also possible. Moreover, one or more of the devices of the NLVD system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the NLVD system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the NLVD system 202 that may efficiently provide a platform for implementing a cloud native NLVD system module, but the disclosure is not limited thereto.

The client devices 208(1)-208(n) may run interface applications, such as standard web browsers or standalone client applications, which may provide an interface to communicate with the NLVD system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the NLVD system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the NLVD system 202, the server devices 204(1)-204(n), or the client devices 208(1)-208(n), for example, may be configured to operate as virtual instances on the same physical machine. For example, one or more of the NLVD system 202, the server devices 204(1)-204(n), or the client devices 208(1)-208(n) may operate on the same physical device rather than as separate devices communicating through communication network(s) 210. Additionally, there may be more or fewer NLVD system 202, server devices 204(1)-204(n), or client devices 208(1)-208(n) than illustrated in FIG. 2. According to exemplary embodiments, the NLVD system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
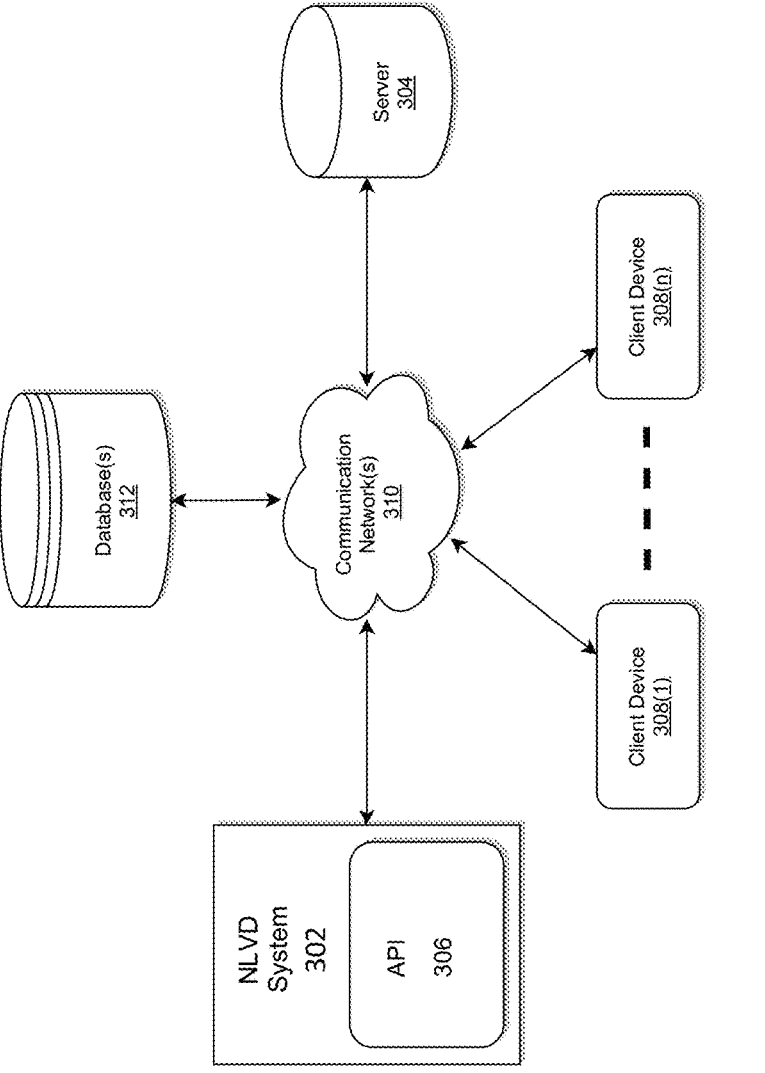
FIG. 3 illustrates a system diagram for implementing an NLVD system in accordance with an exemplary embodiment.

FIG. 3 illustrates a system diagram for implementing an NLVD system in accordance with an exemplary embodiment.

As illustrated in FIG. 3, the system 300 may include an NLVD system 302 within which a group of API modules 306 is embedded, a server 304, a database(s) 312, a plurality of client devices 308(1) . . . 308(n), and a communication network 310.

According to exemplary embodiments, the NLVD system 302 including the API modules 306 may be connected to the server 304, and the database(s) 312 via the communication network 310. Although there is only one database that has been illustrated, the disclosure is not limited thereto. Any number of databases may be utilized. The NLVD system 302 may also be connected to the plurality of client devices 308(1) . . . 308(n) via the communication network 310, but the disclosure is not limited thereto.

According to exemplary embodiment, the NLVD system 302 is described and shown in FIG. 3 as including the API modules 306, although it may include other rules, policies, modules, databases, or applications, for example. According to exemplary embodiments, the database(s) 312 may be embedded within the NLVD system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable NLVD system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the NLVD system 302. In this regard, the plurality of client devices 308(1) . . . 308(n) may be "clients" of the NLVD system 302 and are described herein as such. Nevertheless, it is to be known and understood that the plurality of client devices 308(1) . . . 308(n) need not necessarily be "clients" of the NLVD system 302, or any entity described in association therewith herein. Any additional or alternative relationship may exist between either or both of the plurality of client devices 308(1) . . . 308(n) and the NLVD system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the NLVD system 302 via broadband or cellular communication. Of course, these embodiments are merely exemplary and are not limiting or exhaustive.

The client devices 308(1) . . . 308(n) may be the same or similar to any one of the client devices 208(1)-208(n) as described with respect to FIG. 2, including any features or combination of features described with respect thereto. The NLVD system 302 may be the same or similar to the NLVD system 202 as described with respect to FIG. 2, including any features or combination of features described with respect thereto.

FIG. 4 illustrates a system architecture for utilizing an open-sourced neural network model.

Neuron level malware embedding may be performed by injecting malicious code directly into the neural networks, which may alter behavior and decision-making processes of various machine learning algorithms. However, conventional code vulnerability scanning techniques may not be designed to detect presence of such embedded malware within the neural networks. The neural level malware attacks exploit inherent complexities and vulnerabilities within the architecture of the neural network, rendering them difficult to identify through traditional scanning methods.

As illustrated in FIG. 4, a representational state transfer (REST) application 401 may access a neural network model 403 via an API service 402 over a communication network. For example, the REST application 401 may transmit an input for processing to the neural network model 403 via the API service 402.

According to exemplary aspects, the neural network model 403 may be an open source neural network model, which may include, without limitation, huggingface transformers, pretrainined ResNets, preloaded recommendation engines, and the like. In an example, an open source neural network model may have many contributors (i.e., Contributor 404A, Contributor 404B, and up to Contributor 404N, where N can be any value) providing inputs for adding on to the respective model. Given the large number of contributors that may provide various inputs, open-source neural network models may be vulnerable to potentially receiving a malware from a bad actor. Impact of such embedded malware may include, without limitation, bit-level corruption of data, degradation of performance or intentional delay leading to disruption of services, compromise in sensitive data, which could not be masked due to contribution factor to the model's hypothesis.

In an example, possible entry points for a malware may include, without limitation, compromised endpoints, insider threats, and supply chain attacks. However, without an overseeing entity that monitors various security aspects of such open-source neural network model, a malware that is embedded at a neuron level may go undetected by conventional virus scanning programs. Accordingly, once the neural network model 403 becomes infected, the neural network model 403 may provide a response with the embedded malware or payload back to the requesting REST application 401 (and other downstream components), which may then infiltrate various system resources connected to the REST application 401.

In view of the above noted vulnerabilities, a specialized anomaly detection algorithm for monitoring the neural network model's outputs, activations and performance and the like may be utilized, as exemplarily described with reference to FIG. 5. More specifically, the specialized anomaly detection algorithm may scan or search for any deviations from expected behavior that may indicate a presence of embedded malware. Further, one or more AI or ML algorithms may be utilized for performing a deep-dive analysis of the neural network model to identify specific alternations made by the embedded malware, providing insights into the changes occurring at the neuron level.

Figure 5:
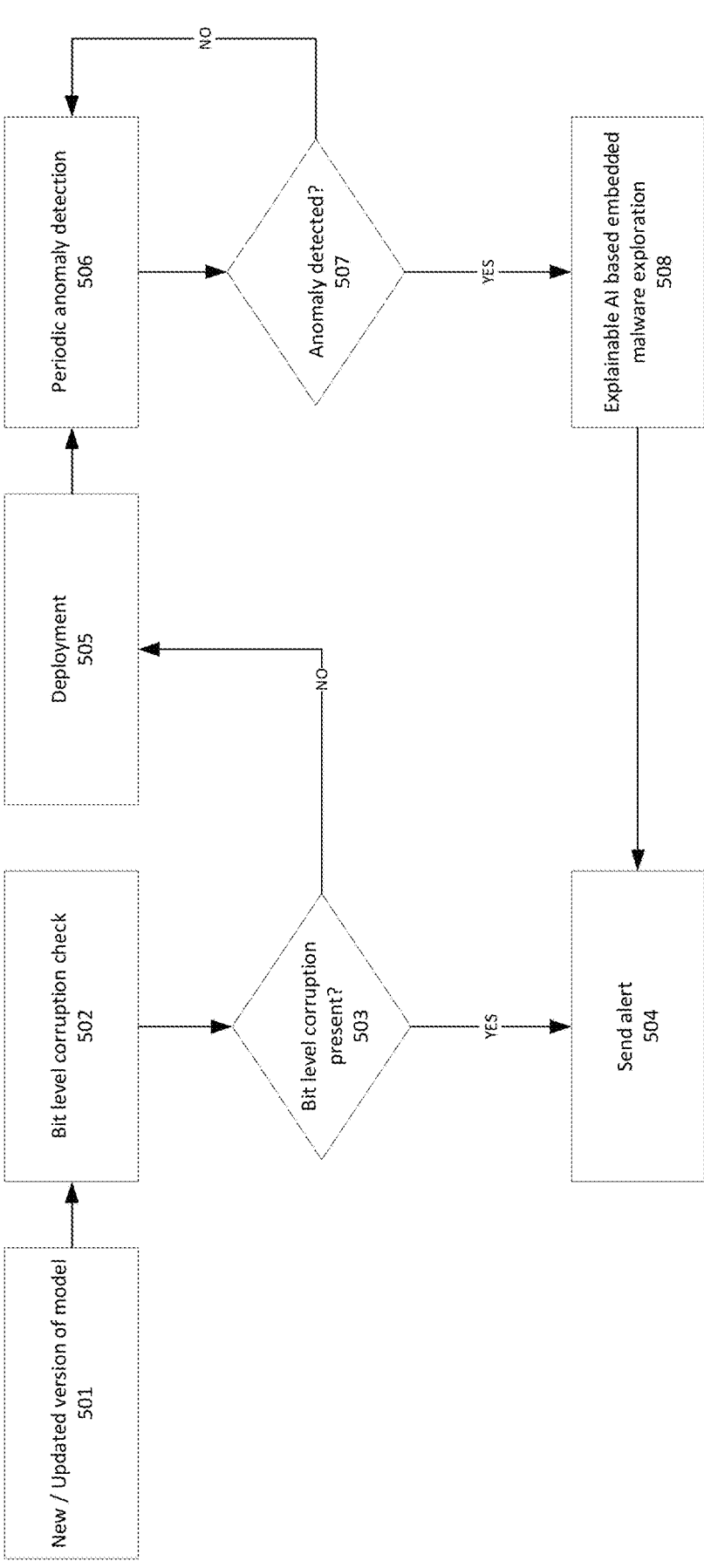
FIG. 5 illustrates a method for performing neuron level vulnerability detection in accordance with an exemplary embodiment.

FIG. 5 illustrates a method for performing neuron level vulnerability detection in accordance with an exemplary embodiment.

According to exemplary aspects, in order to effectively identify neuron level malware attacks, a specialized anomaly detection algorithm may be utilized for analyzing behavior of neural networks in real-time. The specialized anomaly detection algorithm may be configured to monitor the neuron network's outputs, activations and performance for detecting any deviations from expected behavior that may indicate a presence of the neuron level embedded malware. Moreover, for further investigation, an explainable AI algorithm may be employed to identify specific alterations made by the embedded malware, providing insights into the changes occurring at the neuron level. Accordingly, the explainable AI algorithm may help in pinpointing the presence of malware and mitigating its impact.

In operation 501, a new or updated version of a model is received. According to exemplary, the model may include at least one from among a neural network model, machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, N-fold cross-validation analysis, balanced class weight analysis, a In another exemplary embodiment, machine learning analytical techniques may include unsupervised learning algorithms such as, for example, Apriori analysis, K-means clustering analysis, isolation forest analysis, and the like. In another exemplary embodiment, machine learning analytical techniques may include reinforcement learning algorithms such as, for example, Markov Decision Process analysis, and the like.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In operation 502, a bit level corruption check is performed. According to exemplary aspects, a check is performed on the underlying code of the neural network model for possible indications of presence of one or more malwares. For example, an underlying code for the neural network model may be scanned for detection of data corruption, which may potentially cause unintended changes to the original data. According to exemplary aspects, bit-level corruption of data may refer to unusable, inaccurate, unreadable or otherwise inaccessible data, which may be caused by flipping or mixing of the binary code.

Although bit level corruption check is described as a preliminary check on the neural network model, aspects of the present disclosure are not limited thereto, such that additional or alternative checks or scans may be performed. In an example, the additional or alternative checks may include a signature-based or definition approach, static file analysis, check summing or cycling redundancy check, or the like. However, aspects of the present disclosure are not limited thereto, such that other methods for detecting indications of potential presence of malware may be utilized. For example, a closed ended ML or AI algorithm or model may be utilized for checking for data patterns that may indicate a potential presence of malware.

In operation 503, a determination is made on whether the model received in operation 501 includes bit level corruption presence or not. If the model is determined to include the bit level corruption that is above a reference threshold, the method proceeds to operation 504 where the model may be isolated, and an alert is triggered. In an example, the reference threshold may be 0 or a certain level that is determined not to meaningfully impact performance. The reference threshold may be set differently for different models based on their respective application. According to exemplary aspects, the alert may include sending a signal to one or more receiving devices of members of a technical team. In an example, the one or more receiving devices may include, without limitation, a computer, a smart phone, a pager, a notification electronic device, a siren, or other devices capable of providing visual or audible alerts.

On the other hand, if the model is determined not to include the bit level corruption, or the level of corruption is determined to be benign below a certain reference level, then the method proceeds to operation 505, in which the model is sent to deployment. According to exemplary aspects, the deployment may be to a production environment or a testing environment.

Once the model is sent to deployment in operation 505, NLVD system may be configured to perform periodic anomaly detection on the deployed model in operation 506. In an example, the periodic anomaly detection may be performed according to a set schedule, predetermined intervals, or according to a ML or AI algorithm or model.

According to exemplary aspects, the periodic anomaly detection in operation 506 may include, without limitation, heuristics testing, performance testing, and other output or performance based testing to determine normal or abnormal behavior. For example, the periodic anomaly detection may include inputting a set of test data to the deployed neural network model and compare expected output with the received output. Further, the periodic anomaly detection may include checking of processing time for providing of an output for detection of anomalous delay in processing by the neural network model. However, aspects of the present disclosure are not limited thereto, other forms of testing and/or data may be utilized for detection of anomalous activity or performance.

Upon completion of the periodic anomaly detection in operation 506, a check is performed to determine whether the periodic anomaly detection results in a detection of one or more anomalies. If the anomaly is not detected in operation 507, the NLVD system may be configured to perform another periodic anomaly detection at another scheduled interval without further analysis to conserve computing resources and to avoid unnecessary downtime of the respective neural network model. However, aspects of the present disclosure are not limited thereto, such that if an amount or severity of the anomaly detected is below a certain threshold, no immediate action may be taken, and the NLVD system may be configured to perform another periodic anomaly detection at another scheduled interval.

On the other hand, if one or more anomaly is detected in operation 507, then explainable AI based embedded malware exploration may be performed in operation 508.

According to exemplary aspects, the embedded malware exploration may include analysis of the respective neural network model at a neuron level. In an example, a proper neuron network model may generally be fully connected, and include multiple layers, such as an input layer, one or more hidden layers, and an output layer.

According to further aspects, the embedded malware exploration may be performed for each neuron at each layer of the neuron network model. More specifically, each neuron or node forming a neural network layer, for each of the neural network layers, may be analyzed for its relationship with respect to other neurons or nodes, and its respective output and performance. In an example, a properly operating neural network may be interconnected with one or more other neurons, and work together to output a result.

However, if a neuron or a node is not properly connected with other neurons, does not contribute to providing a proper output, and/or provides an intentional delay, the respective neuron or node may be indicated as being a neuron or node including the malware. In such a case, the respective neuron may be identified, and its operations, connections, performance, and other metrics may be captured for further analysis, investigation and/or resolution by a technical team.

Once the embedded malware exploration is completed, the method proceeds to operation 504 for sending an alert to the technical team, along with corresponding details from the embedded malware exploration. According to further aspects, based on the severity of the anomaly detected and/or cause of the anomaly, different levels of alert may be provided to the technical team for investigation and resolution. For example, an anomaly detected to be benign with low impact on operations may trigger a low level alert, where the respective anomaly may be investigated during off-hours or when network traffic is lower to minimize disruptions in normal operations. On the other hand, if the anomaly detected is determined to be severe (e.g., providing false information, compromising of sensitive information, and the like), the alert may specify the neural network model to be immediately taken off-line or otherwise isolated to minimize further impact by the compromised neural network model. However, aspects of the present disclosure are not limited thereto, such that in severe cases, the neural network model may be automatically isolated or taken off-line before the technical team is available to investigate.

Figure 6:
FIG. 6 illustrates a bit-level corruption check pipeline in accordance with an exemplary embodiment.

FIG. 6 illustrates a bit-level corruption check pipeline in accordance with an exemplary embodiment.

According to exemplary aspects, a check may be performed on the underlying code of the neural network model for possible bit corruptions, which may indicate presence of one or more malwares. For example, an underlying code for the neural network model may be scanned for detection of data or bit corruption, which may potentially cause unintended changes to the original data. According to exemplary aspects, bit-level corruption of data may refer to unusable, inaccurate, unreadable or otherwise inaccessible data, which may be caused by flipping or mixing of the binary code.

According to exemplary aspects, the bit-level corruption check pipeline may include, without limitation, file integrity check 601, weight level integrity check 602, redundant model comparison 603, and layer-by-layer bit level parity check 604. Moreover, the bit-level corruption check pipeline may sequentially perform each of the file integrity check 601, the weight level integrity check 602, the redundant model comparison 603 and the layer-by-layer bit level parity check 604. However, aspects of the present disclosure are not limited thereto, such that additional or alternative checks may be performed for the bit-level corruption check. In an example, the additional or alternative checks may include a signature-based or definition approach, static file analysis, check summing or cycling redundancy check, or the like. However, aspects of the present disclosure are not limited thereto, such that other methods for detecting indications of potential presence of malware may be utilized. For example, a closed ended ML or AI algorithm or model may be utilized for checking for data patterns that may indicate a potential presence of malware.

Further, the identified components or checks may be performed in a differing order or with intervening operations. According to an exemplary aspect, each the file integrity check 601, the weight level integrity check 602, the redundant model comparison 603, and the layer-by-layer bit level parity check 604 may be executed in performing the bit-level corruption check. However, aspects of the present disclosure are not limited thereto, such that one or more of the file integrity check 601, the weight level integrity check 602, the redundant model comparison 603, and the layer-by-layer bit level parity check 604 may or may not execute based on the situation.

According to exemplary aspects, the file integrity check 601 may verify checksum, such as cryptographic hashes, to detect file-level corruption. The file integrity check 601 may involve loading the pretrained neural network and ensuring its integrity by checking for file-level corruption. The file integrity check 601 may be performed, for example, cryptographic hashes (e.g., message digest method 5 (MD5) or secure hash algorithm with digest size of 256 bits (SHA-256)) or checksums, which may verify that the neural network model has not been modified or corrupted. If discrepancies are detected, the NLVD system may load the neural network model from a redundant or backup source, ensuring that a reliable neural network model is available for subsequent computations.

According to exemplary aspects, the weight level integrity check 602 may convert weights into bit-level representation and compare against expected values using cyclic redundancy check (CRC). More specifically, once the neural network model is loaded, a bitwise check is performed on each layer's weights and biases to ensure that no corruption has occurred. This process may involve converting the weights into binary or hexadecimal formats and comparing them with the expected values using CRCs. Additionally, error correction mechanisms like Hamming codes may be employed to detect minor bit errors in the weight data maintaining the model accuracy even after sight corruption.

According to exemplary aspects, the redundant model comparison 603 may compare weights with a redundant mirrored model copy to detect discrepancies caused by a bit corruption. The redundant model comparison 603 may provide recovery mechanism to ensure that corruptions do not result in significant or noticeable performance degradation and help to maintain the robustness of the neural network models. More specifically, if corruption is detected at the weight or neuron level, the NLVD system may have mechanisms in place to recover from such errors. Backup copies of the neural network model or layers may replace the corrupted portions, or in cases of partial corruption, selective retraining of impacted layers may restore performance.

According to exemplary aspects, the layer-by-layer bit level parity check 604 may compute and verify parity bits before and after interference to ensure no bits have flipped during computation. More specifically, the layer-by-layer bit level parity check 604 may generate parity bits for each layer's weights to ensure no bit errors occur during the computational process. These parity bits may act as a redundancy check, allowing the system to detect if any single-bit errors have occurred by comparing the parity before and after the inference. If inconsistencies are found, the layer-by-layer bit level parity check 604 may pinpoint which specific layer or set of weights may be affected by bit-level corruption.

Figure 7:
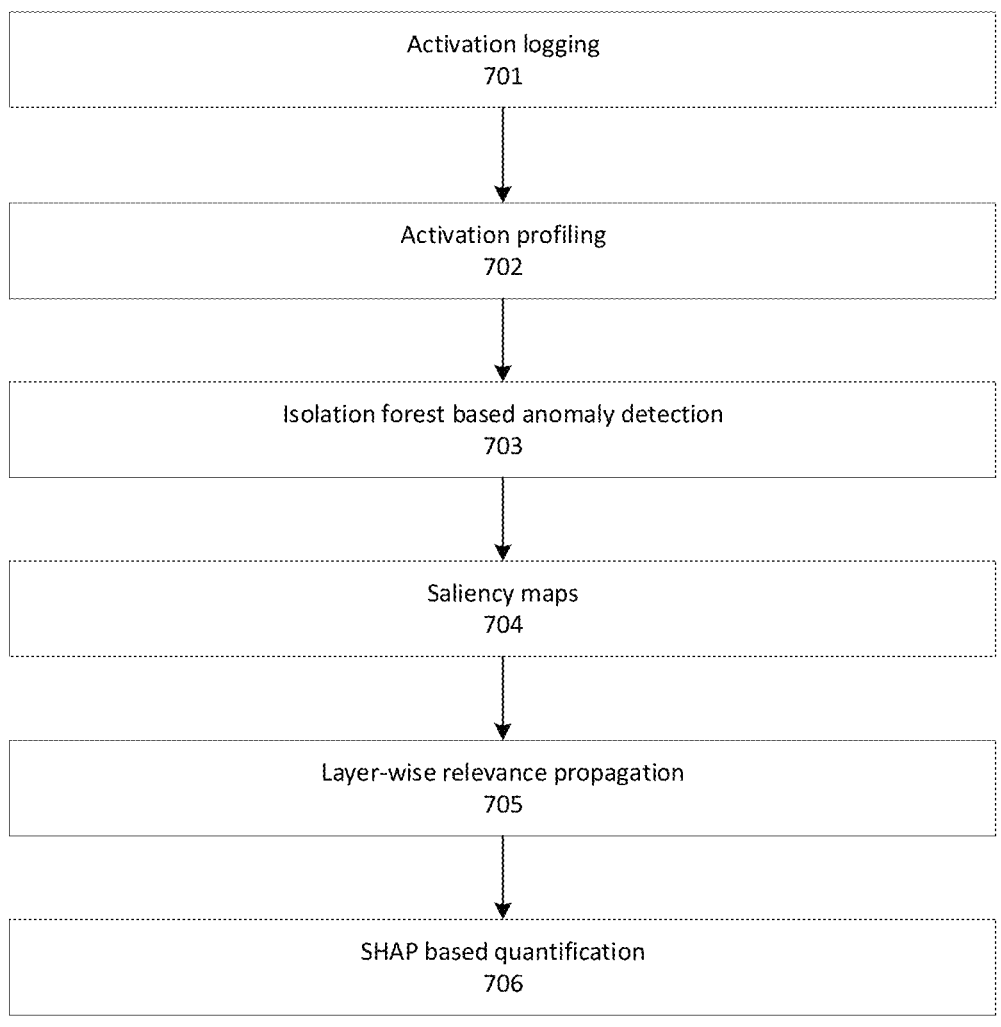
FIG. 7 illustrates an explainable artificial intelligence (XAI) based periodic anomaly detection pipeline in accordance with an exemplary embodiment.

FIG. 7 illustrates an explainable artificial intelligence (XAI) based periodic anomaly detection pipeline in accordance with an exemplary embodiment.

According to exemplary aspects, the periodic anomaly detection may be performed using the XAI and may include, without limitation, heuristics testing, performance testing, and other output or performance based testing to determine normal or abnormal behavior. For example, the periodic anomaly detection may include inputting a set of test data to the deployed neural network model and compare expected output with the received output. Further, the periodic anomaly detection may include checking of processing time for providing of an output for detection of anomalous delay in processing by the neural network model. However, aspects of the present disclosure are not limited thereto, other forms of testing and/or data may be utilized for detection of anomalous activity or performance.

According to further aspects, the periodic anomaly detection pipeline includes an activation logging 701, an activation profiling 702, an isolation forest based anomaly detection 703, saliency maps 704, a layer-wise relevance propagation 705, and a Shapley Additive explanations (SHAP) based quantification 706.

According to exemplary aspects, the activation logging 701 may log neuron activations for each layer during both training and inference. By recording activations, the NLVD system may track how each neuron behaves under different inputs and detect unusual patterns over time. These logs may serve as a baseline for identifying anomalies in neuron behavior.

According to exemplary aspects, the activation profiling 702 may profile normal behavior of neurons by analyzing metrics during the training phase. The metrics may include, for example, mean, variance and activation distribution. This profiling may establish expected ranges for each neuron's activations, creating a reference point to detect deviations during inference, ensuring that any abnormal activities can be flagged.

According to exemplary aspects, the isolation forest based anomaly detection 703 may, by leveraging the isolation forest algorithm, identify neurons which activation deviate from the learned normal profile during inference. This method may be adept at detecting outliers or unusual behaviors in neuron activity that could signal an anomaly, such as bit-level corruption, adversarial attacks or unexpected input patterns.

According to exemplary aspects, the saliency maps 704 may refer to visual representations that highlight the neurons or regions of the network that contributed the most to the neural network model's decision or detected anomaly. The saliency maps 704 may identify the most influential neurons, making it easier to understand why the network flagged certain behaviors as anomalous.

According to exemplary aspects, the layer-wise relevance propagation 705 may trace the neural network model's decision back through the layers, revealing which neurons and layers played a significant or noticeable role in the final output or anomaly detection. By assigning relevance scores to individual neurons, the layer-wise relevance propagation 705 may help in identifying which pars of the network are responsible for specific anomalies, offering deeper insights into the network's internal mechanisms.

According to exemplary aspects, the SHAP based quantification 706 may quantify the contribution of each neuron to the overall prediction or anomaly detection. By calculating the Shapley values, the SHAP based quantification 706 explains how much each neuron contributes to a specific output, enabling users to better understand the role of individual neurons in detecting anomalies and providing a more granular explanation of the neural network model's behavior. With these values, a user may understand which neurons are not contributing significantly or being idle, and consider them as investigation points for the attack.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a neural level vulnerability detection, the method comprising:
   receiving, by a processor, a new or updated version of a neural network model;
   performing, by the processor, a bit-level corruption check on the received neural network model indicating a potential presence of an embedded malware in the neural network model;
   determining, by the processor, whether the neural network model includes the bit-level corruption or not;
   when the neural network model is determined not to include the bit-level corruption, deploying, by the processor, the neural network model;
   upon deployment, scheduling a periodic anomaly detection on the deployed neural network model;
   at a scheduled time, performing the periodic anomaly detection on the deployed neural network model for detecting an anomaly;
   when the anomaly is detected on the neural network model, executing an explainable artificial intelligence (AI) based embedded malware exploration to identify an alteration made by the embedded malware at a neuron level of the neural network model; and
   transmitting, to another device by the processor and over a network, an alert along with the alteration made by the embedded malware.

2. The method according to claim 1, wherein the performing of the periodic anomaly detection on the deployed neural network model includes checking of outputs of the neural network model.

3. The method according to claim 1, wherein the performing of the periodic anomaly detection on the deployed neural network model includes checking for activations in the neural network model.

4. The method according to claim 1, wherein the performing of the periodic anomaly detection on the deployed neural network model includes checking of performance of the neural network model.

5. The method according to claim 1, wherein the performing of the periodic anomaly detection on the deployed neural network model includes checking for a deviation from expected behavior.

6. The method according to claim 5, wherein the checking for the deviation is performed using test input for which output is known.

7. The method according to claim 1, wherein the executing of the explainable AI based embedded malware exploration includes analyzing the neural network model at a neuron level.

8. The method according to claim 7, wherein the analyzing the neural network at the neuron level includes identifying connections of a target neuron with one or more other neurons.

9. The method according to claim 8, wherein the analyzing the neural network at the neuron level further includes an output provided or contributed by the target neuron.

10. The method according to claim 1, wherein the scheduling of the periodic anomaly detection includes scheduling the periodic anomaly detection to be performed intermittently.

11. The method according to claim 1, wherein the neural network model is deployed into a production environment.

12. The method according to claim 1, wherein the neural network model is deployed into a testing environment.

13. The method according to claim 1, wherein the other device to which the alert is transmitted includes an audible device.

14. The method according to claim 1, wherein the other device to which the alert is transmitted includes a display device.

15. The method according to claim 1, wherein the bit-level corruption check includes:

a file integrity check that verify checksum to detect file-level corruption;

a weight level integrity check that convert weights into bit-level representation and compare against expected values using cyclic redundancy check (CRC);

a redundant model comparison that compares weights with a redundant mirrored model copy to detect discrepancies cause by corruption; and a layer-by-layer bit level parity check that compute and verify parity bits before and after interference to ensure no bits have flipped during computation.

16. The method according to claim 1, wherein the file integrity check, the weight level integrity check, the redundant model parison and the layer-by-layer bit level parity check are performed in sequence.

17. The method according to claim 1, wherein the periodic anomaly detection includes:

logging neuron activations for each layer of the neural network model;

profiling a normal behavior while performing training of the neural network model;

detecting deviations or outliers in neuron behavior during inference;

visualizing and quantifying neurons contributing to an anomaly or decision; and performing layer-wise detection of neurons which are most significant in anomaly detection.

18. The method according to claim 1, wherein the periodic anomaly detection is performed based on the explainable AI.

19. A system for performing a neural level vulnerability detection, the system comprising:

a memory; and a processor, wherein the system is configured to perform:

receiving a new or updated version of a neural network model;

performing a bit-level corruption check on the received neural network model indicating a potential presence of an embedded malware in the neural network model;

determining whether the neural network model includes the bit-level corruption or not;

when the neural network model is determined not to include the bit-level corruption, deploying the neural network model;

upon deployment, scheduling a periodic anomaly detection on the deployed neural network model;

at a scheduled time, performing the periodic anomaly detection on the deployed neural network model for detecting an anomaly;

when the anomaly is detected on the neural network model, executing an explainable artificial intelligence (AI) based embedded malware exploration to identify an alteration made by the embedded malware at a neuron level of the neural network model; and transmitting, to another device over a network, an alert along with the alteration made by the embedded malware.

20. A non-transitory computer readable storage medium that stores a computer program for performing a neural level vulnerability detection, the computer program, when executed by a processor, causing a system to perform a plurality of processes comprising:

receiving a new or updated version of a neural network model;

performing a bit-level corruption check on the received neural network model indicating a potential presence of an embedded malware in the neural network model;

determining whether the neural network model includes the bit-level corruption or not;

when the neural network model is determined not to include the bit-level corruption, deploying the neural network model;

upon deployment, scheduling a periodic anomaly detection on the deployed neural network model;

at a scheduled time, performing the periodic anomaly detection on the deployed neural network model for detecting an anomaly;

when the anomaly is detected on the neural network model, executing an explainable artificial intelligence (AI) based embedded malware exploration to identify an alteration made by the embedded malware at a neuron level of the neural network model; and transmitting, to another device over a network, an alert along with the alteration made by the embedded malware.

* * * * *